Oct. 14, 1952          P. F. SCHREIBER          2,613,534
      METHOD OF TESTING FOR EXCESS MOISTURE CONTENT
                   IN REFRIGERATING SYSTEMS
                     Filed July 3, 1948
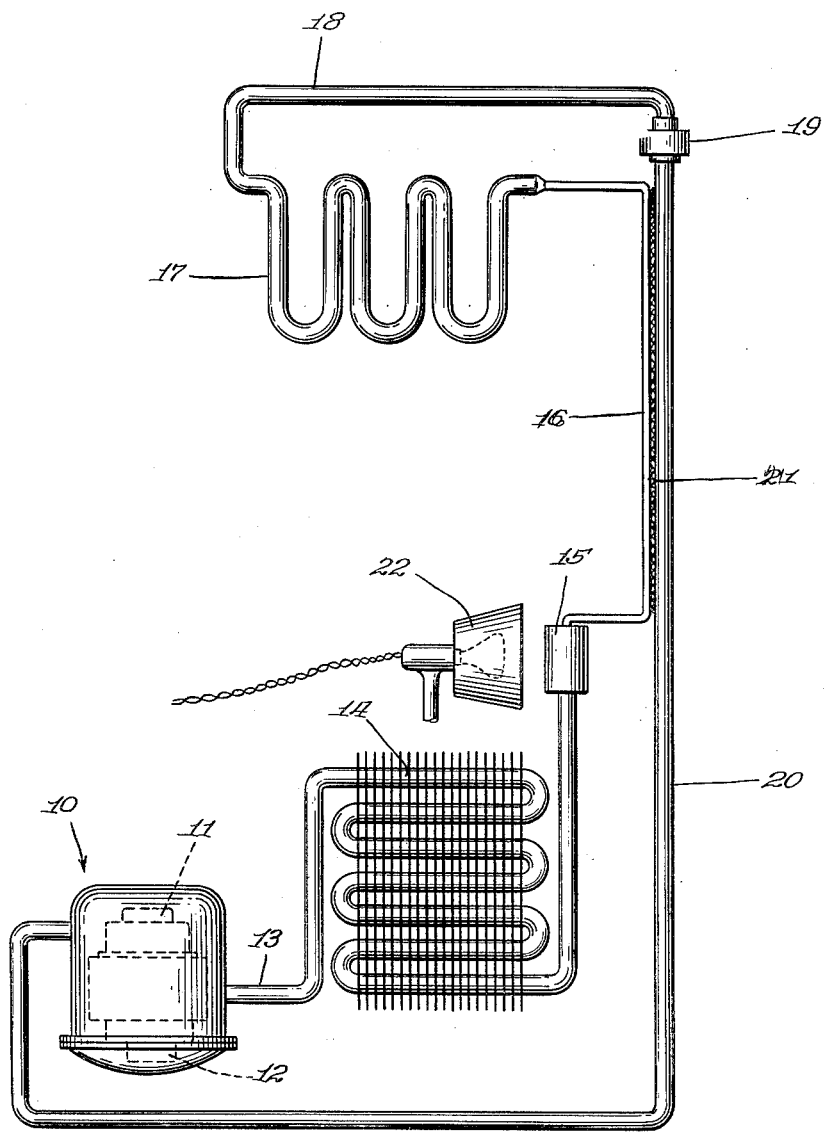
INVENTOR.
Paul F. Schreiber
BY
Paul O. Pippel
Atty.

Patented Oct. 14, 1952

2,613,534

UNITED STATES PATENT OFFICE 2,613,534

METHOD OF TESTING FOR EXCESS MOISTURE CONTENT IN REFRIGERATING SYSTEMS

Paul F. Schreiber, Evansville, Ill., assignor to International Harvester Company, a corporation of New Jersey Application July 3, 1948, Serial No. 36,906

7 Claims. (Cl. 73—73)

This invention relates to a method of determining the presence of excess moisture in a sealed container, but more particularly to a method for determining the presence of excess moisture content in the closed interior of refrigerating apparatus after the conventional dehydrating process has been completed.

In the operation of refrigerating apparatus it is highly essential that the free moisture content within the apparatus be maintained at or below a predetermined amount, usually of the order of five parts per million, in order to avoid freezing-up of the system. Ordinarily an excess of moisture in the hermetically sealed apparatus will cause the formation of ice, under certain conditions, in the small diametered capillary tube that connects the condenser with the evaporator; thus providing an obstruction to the free flow of refrigerant therebetween. An obstruction of this character generally forces the compressor to work harder with the result that there is a rise in temperature therein and frequently a substantial decrease in operating efficiency. Ultimately such moisture will completely block the system and refrigeration will stop. Since such action is naturally unsatisfactory every effort is made to provide a substantially dry system, or, at least, one in which the free moisture content is maintained below the prescribed maximum.

Heretofore the methods proposed for determining the moisture content, and for removing excess moisture from such systems, have involved slow laborious laboratory-type tests which were unsuitable for use in production line operations. One such test procedure involved extracting a quantity of refrigerant, after the dehydration process was completed, and analyzing this to determine the moisture content. Subsequently a quantity of refrigerant equivalent to that removed was put back into the apparatus. Usually one out of approximately every ten refrigerating units going through the production line was arbitrarily selected for sampling and testing; thus the number of units accurately checked for excess moisture was extremely limited with respect to the total production. Although every precaution is taken to avoid the entrance of moisture into the apparatus even under the most modern manufacturing methods, a certain amount of moisture is usually unavoidably sealed into the refrigerating apparatus at the time it is hermetically sealed, and, when this exceeds the prescribed maximum allowable, difficulty will undoubtedly be experienced with the operation of the refrigerating unit during summer periods when high ambient temperatures are encountered.

The present invention obviates the potentiality of difficulties of this character from developing after the apparatus is released for commercial usage because it envisages a 100% testing routine that enables easy detection during manufacture of any refrigerating apparatus that indicates the presence of moisture therein in excess of the prescribed maximum allowable for satisfactory operation under the normally anticipated higher ambient temperatures.

The present invention, therefore, is directed to a method of testing for the determination of excess moisture content in the presence of other liquids in a refrigerating apparatus, and, as such, constitutes the principal object thereof.

Another important object is to provide a simplified procedure for determining the presence of excess moisture in refrigerating apparatus that is readily adaptable to production line requirements so as to permit testing of every unit being fabricated.

Another object of the invention is to provide a simplified procedure for producing simulated exaggerated operating conditions in refrigerating apparatus so that, if excess moisture is present therein, mal-functioning of the apparatus will result.

A further object is to provide a method for causing mal-functioning of refrigerating apparatus so as to indicate the presence of excess free moisture therein.

A still further object is to provide a method for producing the condition of excess free moisture circulating in closed refrigerating apparatus.

A yet still further object is to provide a method for driving moisture out of the dehydrator in a refrigerating system to such an extent that the free moisture content circulating in the system is increased beyond the maximum allowable for satisfactory operation of such system under the variously encountered operating conditions.

These and other objects and advantages of the invention will become apparent as the disclosure is more fully made in the following detailed description of a preferred embodiment when read in conjunction with the single figure of the accompanying drawing which illustrates in schematic form a conventional refrigeration system.

Referring now to the drawing, the conventional refrigeration system, simplified for purposes of illustration in connection with this invention, comprises a compressor unit, indicated generally by the numeral 10, which may be of the hermetically sealed type having an electric driving motor 11 and a compressor 12 coupled together therein, connected by a pipe 13 to a condenser 14, the outlet of which discharges into a dehydrator 15. Into the outlet side of the dehydrator is connected the capillary tube 16, while the opposite end of said tube is connected to one side of an evaporator 17, the opposite end of which is connected by a pipe 18 to an accumulator 19. A discharge or suction pipe 20 returns the refrigerant to the compressor unit 10. In accordance with conventional practice, the capillary tube 16 is shown as being in intimate thermal contact, through a soldered or brazed joint 21, with the suction line 20.

In the conventional refrigerating cycle the refrigerant is forced out of the compressor 12 under pressure into the condenser 14 where it is cooled and then passed into a dryer or dehydrating unit 15, where excess moisture is removed therefrom, and then into the restricted capillary tube 16 before it passes into the heat-extracting evaporating unit 17. This portion of the system is usually referred to as the high-side because the refrigerant is under high pressure. From said evaporating unit the refrigerant next passes through an accumulator 19, after which it is returned by way of the suction line 20 to the compressor unit 10 to complete its cycle. This portion of the system is known as the low-side, since, in this portion the refrigerant is under a lower pressure.

In accordance with well-understood principles the dehydrator contains a solid material, having adsorption properties, which is adapted to collect the molecules of water vapor present in the refrigerant passed therethrough, thus removing the objectionable moisture and preventing its further circulation through the system. Although there are a number of materials, such as the chlorides of calcium, barium and strontium, activated charcoal, and an oxide of silicon known as silica-gel, with which this adsorption may be accomplished, the material known as silica-gel is preferably utilized in the present embodiment of the invention. As the ambient temperature of the dehydrator is increased the ability of the adsorber is, of course, decreased; thus the amount of water vapor collected is correspondingly diminished. When this condition persists, the amount of moisture in the presence of the refrigerant becomes excessive and ultimately freezes-up the capillary tube and obstructs the flow of refrigerant through the system. Consequently while a refrigerating apparatus may function perfectly when tested under factory conditions, because the dehydrator is able to remove enough moisture to keep the system free of excess amounts, still, the same refrigerating unit, when commercially installed elsewhere, frequently freezes up because of excess moisture therein.

Now, in accordance with the teachings of this invention, a condition simulating that which causes the freeze-up during summer temperatures is produced, and each individual refrigerating unit on the production line is made to operate under such exaggerated conditions for a prescribed length of time before the unit is released for commercial distribution and sale.

To accomplish this simulated condition, after the evaporator temperature has attained zero degree Fahrenheit and the condensing unit is cycling normally, a source of heat, such, for instance, as an energized infra-red lamp 22, is placed in close proximity to the dehydrator and the temperature at the dehydrator raised to a temperature approximating 375° F. Although the prescribed time for operation under these conditions may vary for each different type of refrigerating unit, it has been found that when used with an eleven cubic foot zero-degree-type freezer chest, if the condensing unit starts dependably through three complete cycles with no noticeable raising of the evaporator temperature, continued satisfactory operation may be expected. It is desirable, however, that, in any case, the apparatus be operated through a sufficient number of complete cycles to permit detection of the presence of excess moisture therein.

The zero-degree evaporator temperature is mentioned here because this particular type unit is adapted to normally operate at this temperature when installed in a freezer-chest type of refrigerator cabinet. However, other temperatures will, of course, be employed with different types of refrigerating apparatus and it should be understood that the invention is not limited to use with this specific refrigerator cabinet, and at this specific temperature.

If there is moisture circulating in the system, in excess of that permitted for satisfactory operation, it will readily cause a freeze-up in the capillary and restrict the flow of refrigerant through the system, thus placing a greater load on the compressor and ultimately manifesting such condition by raising the temperature of the evaporating unit. Hence, any refrigerating unit that fails to function properly under these test conditions can, of course, be removed from production and reprocessed through the commercial dehydrating process without delaying production line operations. Furthermore, such testing procedure is readily applicable to every refrigerating unit being fabricated without involving hold-up or delay of other units, and, at a very minimum of expense. This method of testing is extremely simple and can be introduced at a very minimum of cost and without any appreciable interference to commercial production line practices.

While an infra-red lamp has been indicated as the preferred source of heat, it will be readily understood that any suitable heat source may be employed without departing from the spirit of this invention.

The manner of achieving the objects and advantages of this invention is believed to be clear from the foregoing detailed description. Other objects and features will undoubtedly occur to those skilled in the art. Likewise, certain modifications and alterations in the preferred concept disclosed may occur, all of which may be made without departing from the spirit and scope of the invention as set forth in the appended claims.

What is claimed is:

1. A method for determining the presence of excess moisture content in a refrigerant circulating in a closed refrigerating apparatus which comprises, operating the refrigerating apparatus until the desired operating evaporator temperature has been attained and the condensing unit is cycling normally, subjecting the moisture adsorbing portion of the high pressure side of the apparatus to external heat, operating the refrigerating apparatus while subjected to such external heat, and detecting the presence of excess moisture by a rise in temperature of the evaporating unit.

2. A method for determining the presence of excess moisture content in a refrigerant circulating in a closed refrigerating apparatus which comprises, operating the refrigerating apparatus until the desired operating evaporator temperature has been attained and the condensing unit is cycling normally, subjecting the moisture adsorbing portion of the high pressure side of the apparatus to an external temperature in the order of 375° Fahrenheit, operating the refrigerating apparatus while subjected to such external temperature, and detecting the presence of excess moisture by an appreciable rise in temperature of the evaporating unit.

3. A method for determining the presence of excess moisture content in a refrigerant circulating in a closed refrigerating apparatus which comprises, operating the refrigerating apparatus until the desired operating evaporator temperature has been attained and the condensing unit is cycling normally, subjecting the dehydrator portion of the high pressure side of the apparatus to external heat, operating the refrigerating apparatus under the subjection of such external heat for the period of time necessary for the condensing unit to start dependably through at least three complete cycles, and detecting the presence of excess moisture by an appreciable rise in temperature of the evaporating unit.

4. A method for determining the presence of excess moisture content in a refrigerant circulating in a closed refrigerating apparatus which comprise, operating the refrigerating apparatus until the desired operating evaporator temperature has been attained and the condensing unit is cycling normally, subjecting the moisture adsorbing portion of the high pressure side of the apparatus to an external temperature in the order of 375 degrees Fahrenheit, operating the refrigerating apparatus while under the subjection of such external heat and with the condensing unit cycling and with the temperature control of the refrigeration apparatus in any position and continuing such operation for a period of time necessary for the condensing unit to start dependably through at least three complete cycles, and detecting the presence of excess moisture by an appreciable rise in temperature of the evaporating unit.

5. A method for determining the presence of excess moisture content in a refrigerant circulating in a closed refrigerating apparatus which comprises, operating the refrigerating apparatus until the desired operating evaporator temperature has been attained and the condensing unit is cycling normally, subjecting the dehydrator unit in the refrigerating apparatus to an external temperature in the order of 375 degrees Fahrenheit, operating the refrigerating apparatus while subjected to such external temperature, and detecting the presence of excess moisture by an appreciable rise in temperature of the evaporating unit.

6. A method for determining the presence of excess moisture in closed refrigerating apparatus of the type wherein excess moisture in the presence of the circulating refrigerant in the system will, upon the application of external heat to the apparatus, effect a temperature rise in the evaporator unit thereof, which method comprises operating the refrigerating apparatus until the desired operating temperature of the evaporator has been attained and the condensing unit is cycling normally, subjecting the dehydrator unit in the refrigerating apparatus to external heat, operating the refrigerating apparatus while under the subjection of such external heat for the period of time necessary to start the condensing unit dependably through three complete cycles, and detecting the presence of excess moisture by an appreciable rise in temperature of the evaporating unit.

7. A method for determining the presence of excess moisture in closed refrigerating apparatus of the type wherein excess moisture in the presence of the circulating refrigerant in the system will, upon the application of the external heat to the apparatus, effect a temperature rise in the evaporator unit thereof, which method comprises operating the refrigerating apparatus until the desired operating temperature of the evaporator has been attained and the condensing unit is cycling normally, subjecting the dehydrator unit in the refrigerating apparatus to the heat of a 375 watt infra-red lamp operated approximately one inch from the exterior thereof, operating the refrigerating apparatus while under the subjection of such external heat for the period of time necessary to start the condensing unit dependably through three complete cycles, and detecting the presence of excess moisture by an appreciable rise in temperature of the evaporating unit.

PAUL F. SCHREIBER.

REFERENCES CITED

The following references are of record in the file of this patent:

UNITED STATES PATENTS

| Number | Name | Date |
| --- | --- | --- |
| 1,866,659 | Little | July 12, 1932 |
| 2,188,303 | Roberts | Jan. 30, 1940 |
| 2,260,608 | Cormack | Oct. 28, 1941 |
| 2,430,692 | Touborg | Nov. 11, 1947 |